US011405085B2

United States Patent
Gao et al.

(10) Patent No.: US 11,405,085 B2
(45) Date of Patent: Aug. 2, 2022

(54) METHOD AND APPARATUS FOR TRANSMISSION PATTERN CONFIGURATION AND SIGNAL DETECTION

(71) Applicant: NEC CORPORATION, Tokyo (JP)

(72) Inventors: Yukai Gao, Beijing (CN); Chuangxin Jiang, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/318,698

(22) PCT Filed: May 12, 2015

(86) PCT No.: PCT/CN2015/078751
§ 371 (c)(1),
(2) Date: Dec. 14, 2016

(87) PCT Pub. No.: WO2016/179791
PCT Pub. Date: Nov. 17, 2016

(65) Prior Publication Data
US 2018/0167122 A1    Jun. 14, 2018

(51) Int. Cl.
*H04B 7/06* (2006.01)
*H04B 7/0413* (2017.01)
(Continued)

(52) U.S. Cl.
CPC ......... *H04B 7/0626* (2013.01); *H04B 7/0413* (2013.01); *H04L 5/0023* (2013.01); *H04L 25/0228* (2013.01); *H04L 27/2613* (2013.01); *H04W 72/04* (2013.01)

(58) Field of Classification Search
CPC ... H04B 7/0626; H04B 7/0413; H04L 5/0023; H04L 25/0228; H04L 27/2613; H04W 72/04
See application file for complete search history.

(56) References Cited

U.S. PATENT DOCUMENTS

2011/0205930 A1   8/2011  Rahman et al.
2012/0176939 A1   7/2012  Qu et al.
(Continued)

FOREIGN PATENT DOCUMENTS

JP    2015-70335 A    4/2015
WO    2014/052806 A1  4/2014
(Continued)

OTHER PUBLICATIONS

International Search Report of PCT/CN2015/078751, dated Feb. 14, 2016. [PCT/ISA/210].
(Continued)

*Primary Examiner* — Jackie Zuniga Abad
(74) *Attorney, Agent, or Firm* — Sughrue Mion, PLLC

(57) ABSTRACT

Embodiments of the present disclosure provide a method for configuring transmission pattern in a wireless system. The method comprises indicating a number of antenna ports to be used for the transmission pattern; and configuring transmission resource for the number of antenna ports by indicating K resource configurations, with each resource configuration indicating resource for one of K subsets of antenna ports which form a set of the number of antenna ports. A method for signal detection according to the transmission pattern is also provided. Embodiments of the present disclosure also provide corresponding apparatus.

20 Claims, 8 Drawing Sheets

(51) Int. Cl.
*H04L 5/00* (2006.01)
*H04L 25/02* (2006.01)
*H04L 27/26* (2006.01)
*H04W 72/04* (2009.01)

(56) References Cited

U.S. PATENT DOCUMENTS

| | | | |
|---|---|---|---|
| 2016/0080059 A1 | 3/2016 | Yoon et al. | |
| 2016/0112173 A1 | 4/2016 | Wang et al. | |
| 2016/0211902 A1* | 7/2016 | Park | H04B 7/0456 |
| 2017/0150499 A1* | 5/2017 | Kim | H04L 27/2613 |

FOREIGN PATENT DOCUMENTS

| | | |
|---|---|---|
| WO | 2014088174 A1 | 6/2014 |
| WO | 2014/123340 A1 | 8/2014 |
| WO | 2014123340 A1 | 8/2014 |
| WO | 2014/163027 A1 | 10/2014 |
| WO | 2014205699 A1 | 12/2014 |

OTHER PUBLICATIONS

Communication dated Jun. 16, 2017, from the European Patent Office in counterpart European Application No. 15891494.5.
LG Electronics "Discussion on non-precoded CSI-RS-based scheme enhancements" 3GPP TSG RAN WG1 Meeting #80bis, Belgrade, Serbia, Apr. 20-24, 2015, R1-151533 (6 pages total).
Communication dated Mar. 2, 2018 from the Canadian Intellectual Property Office in counterpart application No. 2,952,097.
Communication dated Mar. 16, 2018 from the European Patent Office in counterpart application No. 15 891 494.5.
Communication dated Dec. 10, 2018 from the European Patent Office in counterpart application No. 15 891 494.5.
Communication dated Mar. 5, 2019 from Canadian Patent Office in counterpart CA Application No. 2952097.
Communication dated Feb. 27, 2019 from Indian Patent Office in counterpart IN Application No. 201617042466.
Communication dated Mar. 5, 2019 from Japanese Patent Office in counterpart JP Application No. 2017-548025.
Communication dated Feb. 5, 2020 from the European Patent Office in application No. 15891494.5.
Communication dated Feb. 6, 2020 from the Canadian Intellectual Property Office in application No. 2,952,097.
Communication dated Dec. 26, 2019, from The State Intellectual Property Office of the P.R. of China in Application No. 201580077351.5.
Communication dated Oct. 16, 2018 from Japanese Patent Office in JP Application No. 2017-548025.
Communication dated Dec. 3, 2020 by the Canadian Patent Office application No. 2952097.

* cited by examiner

METHOD AND APPARATUS FOR TRANSMISSION PATTERN CONFIGURATION AND SIGNAL DETECTION

CROSS REFERENCE TO RELATED APPLICATIONS

This application is a National Stage of International Application No. PCT/CN2015/078751 filed May 12, 2015, the contents of all of which are incorporated herein by reference in their entirety.

TECHNICAL FIELD

The non-limiting and exemplary embodiments of the present disclosure generally relate to the technical field of radio communications, and specifically to a method and apparatus for transmission pattern configuration and signal detection.

BACKGROUND

This section introduces aspects that may facilitate a better understanding of the disclosure. Accordingly, the statements of this section are to be read in this light and are not to be understood as admissions about what is in the prior art or what is not in the prior art.

Multiple Input and Multiple Output (MIMO) techniques have been known as an effective way for improving spectrum efficiency (SE) in wireless communication systems. For example, MIMO has been adopted as a key feature of Long Term Evolution (LTE)/LTE-Advanced (LTE-A) system developed by the third generation project partnership (3GPP). Conventional one-dimensional (horizontal domain) antenna array can provide flexible beam adaption in the azimuth domain only through the horizontal domain precoding process, wherein a fixed down-tilt is applied in the vertical direction. It has been found recently that full MIMO capability can be exploited through leveraging a two dimensional antenna planar such that a user-specific elevation beamforming and spatial multiplexing in the vertical domain are also possible.

A Study Item of 3GPP Release 12 proposed to study user specific beamforming and full dimensional MIMO (i.e., 3D MIMO) with 2D antenna arrays (also known as Active Antenna System (AAS)). It can potentially improve transmit and/or receive gain, and reduce intra/inter-cell interference.

In a Study Item (SI) of 3GPP Release 13, antenna configurations for 2D antenna arrays with {8, 16, 32, 64} transmitting RF units (TXRUs) will be used to evaluate elevation beamforming benefit. To facilitate 3D channel information measurement at a user equipment (UE) side, channel state information reference signal (CSI-RS) should be transmitted from 8 or more antenna ports. Transmission of CSI-RS with {8, 16, 32, 64} antenna ports may be discussed.

SUMMARY

Various embodiments of the disclosure provide flexible transmission pattern configuration. Other features and advantages of embodiments of the disclosure will also be understood from the following description of specific embodiments when read in conjunction with the accompanying drawings, which illustrate, by way of example, the principles of embodiments of the disclosure.

In a first aspect of the disclosure, there is provided a method for configuring transmission pattern in a wireless system. The method comprises indicating a number of antenna ports to be used for the transmission pattern; and configuring transmission resource for the number of antenna ports by indicating K resource configurations, with each resource configuration indicating resource for one of K subsets of antenna ports, wherein K>1 and the K subsets of antenna ports form a set of the number of antenna ports.

In one embodiment of the disclosure, each of the K resource configurations may be selected from a predefined set of configurations, and the ith subset of the K subsets of antenna ports contains $N_i$ antenna ports, wherein $1<=i<=K$, and wherein all $N_i$ or all but the smallest $N_i$ may belong to a predefined set of integers.

In another embodiment of the disclosure, configuring transmission resource for the number of antenna ports by indicating K resource configurations may comprise indicating the K resource configurations according to a predefined order, wherein the predefined order depends on size of each of the K subsets of antenna ports.

In another embodiment of the disclosure, configuring transmission resource for the number of antenna ports by indicating K resource configurations may comprise using a part of one of the K resource configurations to indicate resource for one of the K subsets of the antenna ports.

In still another embodiment of the disclosure, indicating a number of antenna ports to be used for the transmission pattern may comprise indicating the number of antenna ports via a radio resource control RRC signaling; and wherein configuring transmission resource for the number of antenna ports by indicating K resource configurations comprises indicating the K resource configurations via same RRC signaling.

In some embodiments, the transmission pattern can be a channel state information reference signal CSI-RS transmission pattern.

In one embodiment of the disclosure, the method may further comprise indicating a set of physical resource blocks PRBs, in which the K resource configurations apply, or, indicating, for each of the K resource configurations, a set of physical resource blocks PRBs in which the corresponding resource configuration applies.

In another embodiment, the method may further comprise indicating a set of subframes, in which the K resource configurations apply, or, indicating, for each of the K resource configurations, a set of subframes in which the corresponding resource configuration applies. In one embodiment, a first set of subframes being indicated may include a special subframe of a time division duplex TDD system, and a first resource configuration of the K resource configurations which applies in the first set of subfames may indicate a TDD special subframe specific resource configuration. In another embodiment, the TDD special subframe specific resource configuration may indicate resources that do not collide with resources for primary synchronization signal PSS, secondary synchronization signal SSS, system information block 1, paging information, and physical broadcast channel PBCH.

In still another embodiment, the method may further comprise indicating a subband of the wireless system, in which the K resource configurations apply, or, indicating, for each of the K resource configurations, a subband of the wireless system in which the corresponding resource configuration applies.

In a second aspect of the disclosure, there is provided a method for signal detection in a wireless system. The method comprises receiving a transmission pattern configuration for the signal, and detecting the signal according to the received transmission pattern configuration, wherein the transmission pattern configuration may comprise an indication indicating a number of antenna ports to be used for the signal transmission; and K resource configurations, wherein each resource configuration indicates resource for one of K subsets of antenna ports, wherein K>1 and the K subsets of antenna ports form a set of the number of antenna ports.

In one embodiment, each of the K resource configurations is selected from a predefined set of configurations, and the ith subset of the K subsets of antenna ports contains $N_i$ antenna ports, wherein $1<=i<=K$, and wherein all $N_i$ or all but the smallest $N_i$ belong to a predefined set of integers.

In another embodiment, the K resource configurations included in the transmission pattern configuration may be indicated according to a predefined order, and wherein the predefined order depends on size of each of the K subsets of antenna ports.

In one embodiment, a first resource configuration of the K resource configurations may indicate resource for one of the K subsets of antenna ports by using part of the first resource configuration.

In another embodiment, receiving a transmission pattern configuration for the signal may comprise receiving a transmission pattern configuration via a radio resource control RRC signaling.

In some embodiments, the signal can be a channel state information reference signal CSI-RS.

In one embodiment, the transmission pattern configuration may further comprise an indication of a set of physical resource blocks PRBs where the K resource configurations apply, or, an indication of a set of physical resource blocks PRBs, for each of the K resource configurations, indicating the set of physical resource blocks PRBs where the corresponding resource configuration applies.

In another embodiment, the transmission pattern may further comprise an indication of a set of subframes, in which the K resource configurations apply, or, an indication of a set of subframes, for each of the K resource configurations, indicating the set of subframes in which the corresponding resource configuration applies. In an embodiment, a first set of subframes being indicated includes a special subframe of a time division duplex TDD system, and a first resource configuration of the K resource configurations which applies in the first set of subfames indicates a TDD special subframe specific resource configuration. In another embodiment, the TDD special subframe specific resource configuration indicates resources that do not collide with resources for primary synchronization signal PSS, secondary synchronization signal SSS, system information block 1, paging information, and physical broadcast channel PBCH.

In still another embodiment, the transmission pattern configuration may further comprise an indication of a subband of the wireless system, in which the K resource configurations apply, or, an indication of a subband of the wireless system, for each of the K resource configurations, indicating the subband of the wireless system in which the corresponding resource configuration applies.

In a third aspect of the disclosure, there is provided an apparatus for configuring transmission pattern in a wireless system. The apparatus comprises an antenna port indication module, configured to indicate a number of antenna ports to be used for the transmission pattern; and a resource configuration module, configured to configure transmission resource for the number of antenna ports by indicating K resource configurations, with each resource configuration indicating resource for one of K subsets of antenna ports which form a set of the number of antenna ports.

In a fourth aspect of the disclosure, there is provided an apparatus for signal detection in a wireless system. The apparatus comprises a receiving module, configured to receive a transmission pattern configuration for the signal, and a detection module, configured to detect the signal according to the received transmission pattern configuration, wherein the transmission pattern configuration comprises an indication indicating a number of antenna ports to be used for the signal transmission; and K resource configurations, wherein each resource configuration indicates resource for one of K subsets of antenna ports which form a set of the number of antenna ports.

In a fifth aspect of the disclosure, there is provided an apparatus for transmission pattern configuration in a wireless system. The apparatus comprises a processor and a memory, said memory containing instructions executable by said processor whereby said apparatus is operative to perform any method in accordance with the first aspect of the disclosure.

In a sixth aspect of the disclosure, there is provided an apparatus for transmission pattern configuration in a wireless system. The apparatus comprises a processor and a memory, said memory containing instructions executable by said processor whereby said apparatus is operative to perform any method in accordance with the second aspect of the disclosure.

According to the various aspects and embodiments as mentioned above, by reusing resource configuration patterns for a small number of antenna ports to configure resource for a large number of antenna ports, transmission pattern design for a large number of antenna ports can be simplified, and transmission pattern configuration is made flexible.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
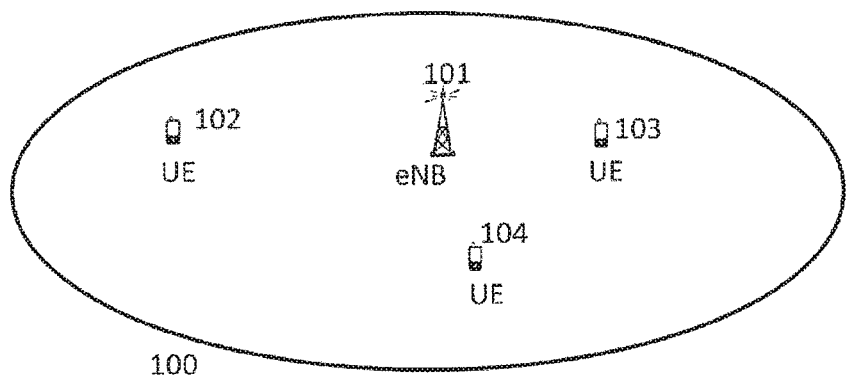
FIG. 1 illustrates an exemplary wireless system where embodiments of the present invention may be implemented.

Hereinafter, the principle and spirit of the present disclosure will be described with reference to the illustrative embodiments. It should be understood, all these embodiments are given merely for the skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment", "an embodiment", "an example embodiment" etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is associated with the knowledge of one skilled in the art to affect such feature, structure, or characteristic in connection with other embodiments whether or not explicitly described.

It shall be understood that, although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skill in the art to which this disclosure belongs. For example, the term terminal device used herein may refer to any terminal having wireless communication capabilities, including but not limited to, mobile phone, cellular phones, smart phone, or personal digital assistants (PDAs), portable computers, image capture device such as digital cameras, gaming devices, music storage and playback appliances, wearable devices and any portable units or terminals that have wireless communication capabilities, or Internet appliances permitting wireless Internet access and browsing and the like. Likewise, the term base station used herein may be referred to as e.g. eNB, eNodeB, NodeB, Base Transceiver Station BTS or Access Point (AP), depending on the technology and terminology used.

The following description of various embodiments aims at illustrating the principle and concept of the present disclosure. For illustrative purposes, several embodiments of the present disclosure will be described in the context of CSI-RS configuration and detection in a 3GPP LTE system. Those skilled in the art will appreciate, however, that several embodiments of the present disclosure may be more generally applicable to any other signal configuration and detection, in any other wireless systems.

In FIG. 1, an exemplary wireless system 100, in which embodiments of the present invention may be implemented, is illustrated. The wireless system 100 comprises one or more network nodes, e.g., 101, here in the form of evolved Node B, also known as eNode Bs or eNB s. It will be appreciated that the network node 101 could also be in the form of Node Bs, BTSs (Base Transceiver Stations), BS (Base Station) and/or BSSs (Base Station Subsystems), etc. The network node 101 may provide a macro cell or small cell and provide radio connectivity to a plurality of UEs, e.g., UE 102-104. The UE can be any wireless communication device which is portable or fixed. Moreover, the UEs 102-104 may, but not necessarily, be associated with a particular end user. Though for illustrative purpose, the wireless system 100 is described to be a 3GPP LTE network, the embodiments of the present disclosure are not limited to such network scenarios and the proposed methods and devices can also be applied to other wireless networks, e.g., a non-cellular network, where the principles described hereinafter are applicable.

In an embodiment, the network node, e.g., eNB 101 may transmit CSI-RS from multiple antenna ports to facilitate channel estimation at the UE (e.g., UE 102) side. In current LTE system, e.g., LTE Release 10, up to 8 antenna ports for CSI-RS transmission are allowed. The existing CSI-RS transmission can be configured using parameters shown in Table 1, and details of the parameters can be in section 6.3.2 of the 3GPP TS 36.331, V10.7.0 "Evolved Universal Terrestrial Radio Access (E-UTRA); Radio Resource Control (RRC) protocol specification."

TABLE 1

| Existing CSI-RS configuration | |
|---|---|
| antennaPortsCount-r10 | ENUMERATED {an1, an2, an4, an8}, |
| resourceConfig-r10 | INTEGER (0 . . . 31), |
| subframeConfig-r10 | INTEGER (0 . . . 154), |

Furthermore, in current LTE system, it is specified, e.g., in section 6.10.5 of the 3GPP TS 36.211, V10.7.0, "Evolved Universal Terrestrial Radio Access (E-UTRA); Physical channels and modulation", that CSI-RS are not transmitted
    in the Downlink Pilot Time Slot(s) (DwPTS(s)) in case of frame structure type 2 (i.e., a TDD frame), wherein the DwPTS is a part used for downlink in a special subframe of TDD system;
    in a subframe where transmission of a CSI-RS would collide with SystemInformationBlockType 1 message;

in a primary cell in subframes configured for transmission of paging messages in the primary cell for any UE with the cell-specific paging configuration.

To support more complex MIMO operation, e.g., three dimensional MIMO (3D-MIMO) with 2D antenna arrays, CSI-RS may need to be transmitted from more than 8 antenna ports. Therefore new CSI-RS configuration has to be designed. One object of the embodiments of the invention is to provide CSI-RS configuration for a flexible number of antenna ports.

Figure 2:
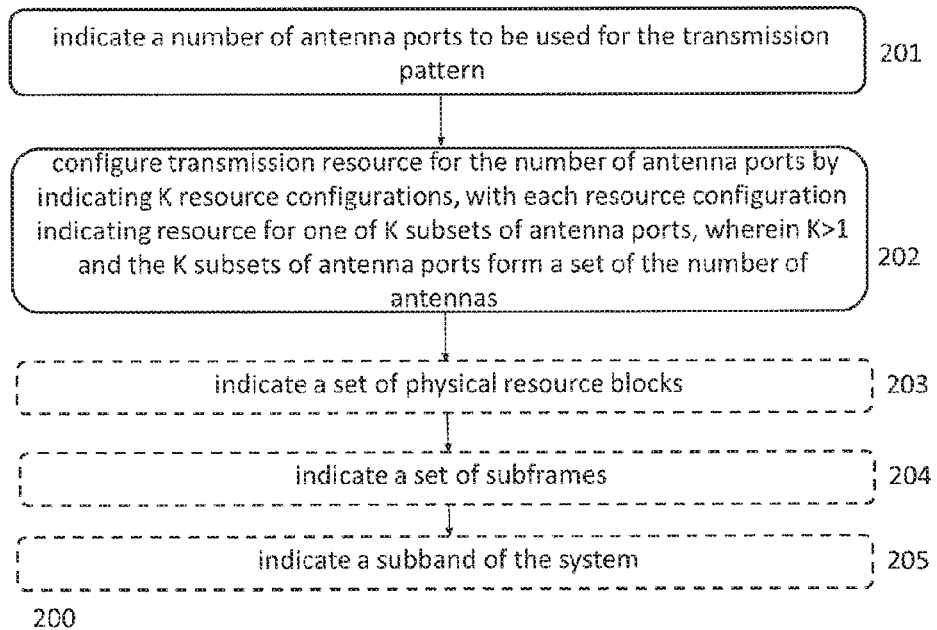
FIG. 2 illustrates an exemplary flowchart of a method for a signal transmission pattern configuration according to an embodiment of the present disclosure.

FIG. 2 illustrates an exemplary flowchart of a method 200 for a signal transmission pattern configuration according to an embodiment of the present disclosure. It can be appreciated that the signal can be, but not limited to, CSI-RS. Actually, the method 200 may apply to transmission pattern configuration for any suitable signals to solve similar problem. The method 200 can be performed by a base station, e.g., the eNB 101 shown in FIG. 1, but the present disclosure is not limited thereto. The method 200 may be performed by any other suitable device.

As shown in FIG. 2, at block 201, the base station indicates a number of antenna ports to be used for the transmission pattern; and at block 202, the base station configures transmission resource for the number of antenna ports by indicating K resource configurations, with each resource configuration indicating resource for one of K subsets of antenna ports, wherein K>1 and the K subsets of antenna ports form a set of the indicated number of antenna ports.

In one embodiment, at block 201, the base station may indicate the number of antenna ports using a parameter antennaPortsCount as shown in Table 2. The parameter antennaPortsCount may indicate a value N from a predefined set, e.g., $\{1, 2, 3, 4, 5, \ldots, M\}$, or $\{1, 2, 4, 6, 8, 10, \ldots, M\}$, or $\{1, 2, 4, 8, 16, \ldots, M\}$. The maximum number of antenna ports M may be predefined, or fixed. In another embodiment, the base station may indicate an index of the value N in a predefined set. It should be appreciated that embodiments of the disclosure are not limited to any specific way for indicating the number N of antenna ports.

In another embodiment, at block 202, the indicated K resource configurations can be K resourceConfig signaling, as shown in Table 2, wherein each resourceConfig indicates resource for a subset of the N antenna ports.

TABLE 2

| CSI-RS transmission pattern configuration | |
|---|---|
| antennaPortsCount | ENUMERATED {an1 -- M}, |
| resourceConfig | Resource configuration of CSI-RS |
| . . . | . . . |
| resourceConfig | Resource configuration of CSI-RS |

In one embodiment, assuming the base station indicates, at block 201, N=10 antenna ports to be used for CSI-RS transmission. The N=10 antenna ports may be grouped into K=2 subsets of antenna ports, with $N_1$=8 antenna ports in subset 1, and $N_2$=2 antenna ports in subset 2. In another exemplary embodiment, assuming N=14 is indicated at block 201, the N=14 antenna ports may be grouped into K=3 subsets, with $N_1$=8 antenna ports in subset 1, $N_2$=4 antenna ports in subset 2 and $N_3$=2 antenna ports in subset 3. As another example, K subsets can be subset 1 with $N_1$=4 antenna ports, and subset 2 with $N_2$=2 antenna ports, and the K=2 subsets form a set of N=6 antenna ports. More examples of the number of N and its division into K subsets can be found in Table 3A. In one embodiment, when N=1, 2, 4, or 8 antenna ports are to be used for the transmission pattern, existing resource configuration signaling as shown in Table 1 can be used, and for other values of $N_i$ the N antenna ports can be divided into 2 or 3 subsets as shown in Table 3A. In another embodiment, even for N=2, 4 and 8, the N antenna ports can be divided into K>1 subsets. It can be appreciated that embodiments of the disclosure are not limited to the specific division shown in Table 3A.

TABLE 3A

Example of subsets of N antenna ports

| Antenna ports number N | 1st subsets of antenna ports | 2nd subsets of antenna ports | 3rd subsets of antenna ports |
|---|---|---|---|
| 1 | 1 port | N/A | N/A |
| 2 | 2 ports | N/A | N/A |
| 3 | 2 ports | 1 port | N/A |
| 4 | 4 ports | N/A | N/A |
| 5 | 4 ports | 1 port | N/A |
| 6 | 4 ports | 2 ports | N/A |
| 7 | 4 ports | 2 ports | 1 port |
| 8 | 8 ports | N/A | N/A |
| 9 | 8 ports | 1 port | N/A |
| 10 | 8 ports | 2 ports | N/A |
| 11 | 8 ports | 2 ports | 1 port |
| 12 | 8 ports | 4 ports | N/A |
| 13 | 8 ports | 4 ports | 1 port |
| 14 | 8 ports | 4 ports | 2 ports |
| 15 | 8 ports | 7 ports | N/A |
| 16 | 8 ports | 8 ports | N/A |

Assuming there are $N_i$ antenna ports in the ith subset of antenna ports, $1<=i<=K$. In one embodiment, each of the K $N_i$ belongs to a predefined set of integers. For example, each $N_i$ can be, but not limited to, one of $\{1, 2, 4, 8\}$ which are the number of CSI-RS antenna ports supported by current LTE system. In another embodiment, all but the smallest $N_i$ belong to a predefined set of integers. For example, N=11 antenna ports are indicated at block 201, and the N=11 antenna ports can be grouped into 2 subsets, with $N_1$=8 antenna ports in the first subset, and $N_2$=3 antenna ports in the second subset. $N_1$=8 belongs to the set of $\{1, 2, 4, 8\}$, while the smallest $N_i$, i.e., $N_2$=3, does not belong to the set of $\{1, 2, 4, 8\}$. In still another embodiment, $N_i$ may be any number smaller than or equal to N.

At block 202, the base station may configure resource for the N antenna ports by indicating resource configuration for each subset of antenna ports, i.e., each $N_i$ antenna ports. One example is shown in Table 2, where a field called resourceConfig is used for this purpose, for each subset of antenna port. That is, in one embodiment, resource for each of the K subsets of antenna ports shown in Table 3A may be indicated using resourceConfig signaling as shown in Table 2, respectively. Some examples of such resource indication can be found in Table 3B. This allows using a resource configuration for small number (i.e., $N_i$) of antenna ports to configure resource for a large number (i.e., N) of antenna ports, and thereby avoiding resource configuration design for a specific number of antenna ports.

TABLE 3B

Example of K resource configurations for K subsets of N antenna ports

| | resourceConfig field - Number of CSI RS resource configuration | | |
|---|---|---|---|
| Antenna ports number N<br>Bit number: 4 bits | 1st<br>Bit number: 5 bits | 2nd<br>Bit number: 5 bits | 3rd<br>Bit number: 5 bits |
| 1 | resourceConfig of 1 port | N/A | N/A |
| 2 | resourceConfig of 2 ports | N/A | N/A |
| 3 | resourceConfig of 2 ports | resourceConfig of 1 port | N/A |
| 4 | resourceConfig of 4 ports | N/A | N/A |
| 5 | resourceConfig of 4 ports | resourceConfig of 1 port | N/A |
| 6 | resourceConfig of 4 ports | resourceConfig of 2 ports | N/A |
| 7 | resourceConfig of 4 ports | resourceConfig of 2 ports | resourceConfig of 1 port |
| 8 | resourceConfig of 8 ports | N/A | N/A |
| 9 | resourceConfig of 8 ports | resourceConfig of 1 port | N/A |
| 10 | resourceConfig of 8 ports | resourceConfig of 2 ports | N/A |
| 11 | resourceConfig of 8 ports | resourceConfig of 2 ports | resourceConfig of 1 port |
| 12 | resourceConfig of 8 ports | resourceConfig of 4 ports | N/A |
| 13 | resourceConfig of 8 ports | resourceConfig of 4 ports | resourceConfig of 1 port |
| 14 | resourceConfig of 8 ports | resourceConfig of 4 ports | resourceConfig of 2 ports |
| 15 | resourceConfig of 8 ports | resourceConfig of 8 ports, 7 ports used | N/A |
| 16 | resourceConfig of 8 ports | resourceConfig of 8 ports | N/A |

In one embodiment, each of the K resource configurations indicated at block 202 may be a configuration selected from a predefined set of configurations. For example, the predefined set of configurations can be, but not limited to, a set of existing resource configurations (e.g., denoted as 0 to 31 in Table 4) for 1, 2, 4, or 8 antenna ports in current LTE Release 10, as shown in Table 4.

TABLE 4

Current CSI-RS configuration (normal CP)

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

The K resource configurations as shown in Table 2, may be indicated according to a predefined order which determines, for example, which of the K resourceConfig shown in Table 2 should be indicated first. The predefined order may depend on size of each of the K subsets, in one embodiment. For example, resource configuration for a subset of antenna ports with a larger size (i.e., a subset with more antenna ports) will be indicated first. That is, resource for N=10 antenna ports may be configured by indicating resource configuration for a subset of $N_1=8$ antenna ports, followed by resource configuration for a subset of $N_2=2$ antenna ports. It can be appreciated that embodiments of the disclosure are not limited to any specific indication order, as long as the order is known to both the transmitter and the receiver. For example, in another embodiment, resourceConfig for a subset of $N_2=2$ antenna ports may be indicated first, followed by resourceConfig for a subset of $N_1=8$ antenna ports.

Figure 3A:
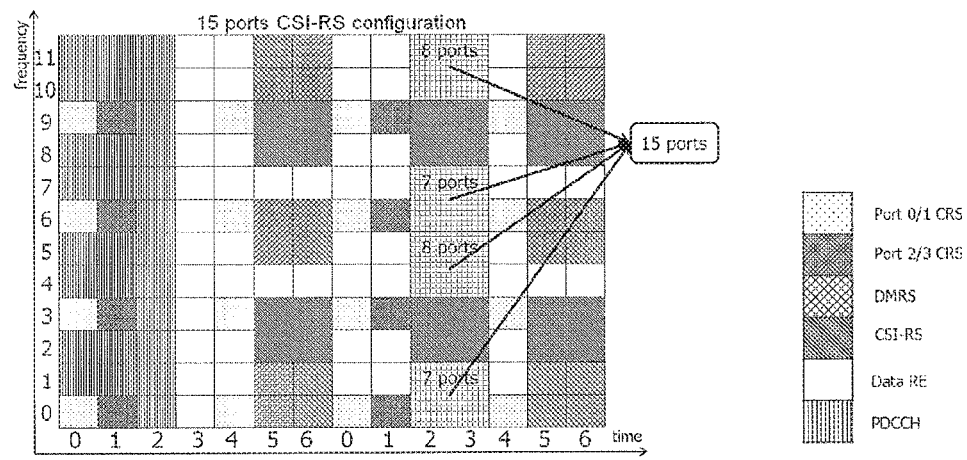
FIG. 3A shows an example of 15 antenna ports CSI-RS resource configuration within one physical resource block pair.

In one embodiment, at block 202, the base station may configure transmission resource for the N antenna ports by using a part of one of the K resource configurations to indicate resource for one of the K subsets. One example is shown in Table 3B. As shown in Table 3B, resource for N=15 antenna ports can be configured by indicating resource for 8 antenna ports, and resource for 7 antenna ports, where the resource for 7 antenna ports can be indicated by using part (i.e., 7 ports) of a resource configuration for 8 antenna ports, in order to reuse existing resource configuration patterns, and avoid introducing new configuration for 7 antenna ports. One example of the resource allocation for the 15 CSI-RS antenna ports within one physical resource block (PRB) pair is depicted schematically in FIG. 3A, where normal cyclic prefix (CP) configuration of LTE is assumed. Resource for 8-ports CSI-RS plus resource for 7-ports CSI-RS form the resource for the 15-ports CSI-RS, and resource for the 7-ports CSI-RS are part of a resource configuration for 8-ports CSI-RS. These resources for the 15 ports CSI-RS are orthogonal with resource elements (REs) for cell-specific RS (CRS) demodulation RS (DMRS), existing CSI-RS for antenna port 15-22, physical downlink control channel (PDCCH) and downlink data, as shown in FIG. 3A. Same resource allocation for the 15 CRS-RS antenna ports may apply to all PRB pairs within the whole system bandwidth.

As shown in Table 3B, for N=7, 11, 13 and 14 antenna ports, resource can be configured by indicating K=3 resource configurations. In one embodiments, however, resource for N=7, 11, 13 and 14 antenna ports may also be configured by indicating only two resource configurations, in similar way as that for N=15 in above example, in order to save configuration signaling. For example, N=14 antenna ports may be divided into 2 subsets, with $N_1=8$ and $N_2=6$, as shown in Table 5A.

Figure 3B:
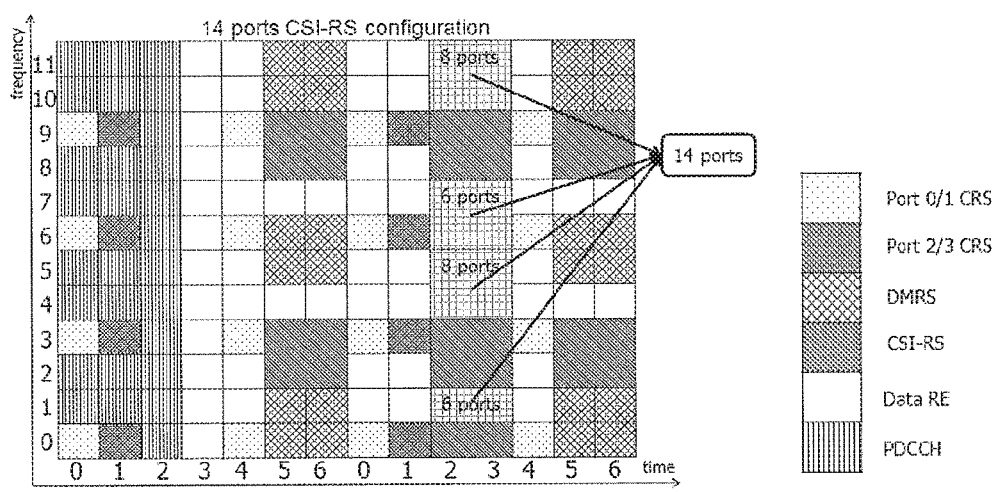
FIG. 3B shows an example of 14 antenna ports CSI-RS resource configuration within one physical resource block pair.

In another embodiment, resource for the 2 subsets which form a set of N=14 antenna ports may be indicated via resourceConfig, as shown in Table 5B, wherein resource for the $N_2=6$ antenna ports can be configured by using part (i.e., 6 ports) of a resource configuration for 8 antenna ports. One example of the resource allocation for the 14 CSI-RS antenna ports within one PRB pair is depicted schematically in FIG. 3B, where normal CP configuration of LTE is also assumed. Resource for 8-ports CSI-RS plus resource for 6-ports CSI-RS form the resource for the 14-ports CSI-RS, and resource for the 6-ports CSI-RS are part of a resource configuration for 8-ports CSI-RS. Likewise, same resource configuration as in FIG. 3B may apply to all PRB pairs within the system bandwidth. By putting a restriction on the maximum number of subsets, signaling overhead for the resource configuration may be reduced. More examples for configuring resource for N<=16 antenna ports by using up to 2 resource configurations can be found in Table 5B.

TABLE 5A

Examples of subsets of N antenna ports

| Antenna ports number N | 1st subsets of antenna ports | 2nd subsets of antenna ports |
|---|---|---|
| 1 | 1 port | N/A |
| 2 | 2 ports | N/A |
| 3 | 2 ports | 1 port |
| 4 | 4 ports | N/A |
| 5 | 4 ports | 1 port |
| 6 | 4 ports | 2 ports |
| 7 | 4 ports | 3 ports |
| 8 | 8 ports | N/A |
| 9 | 8 ports | 1 port |
| 10 | 8 ports | 2 ports |
| 11 | 8 ports | 3 ports |
| 12 | 8 ports | 4 ports |
| 13 | 8 ports | 5 ports |
| 14 | 8 ports | 6 ports |
| 15 | 8 ports | 7 ports |
| 16 | 8 ports | 8 ports |

TABLE 5B

Examples of configuring resource for up to 2 subsets of N antenna ports

| | resourceConfig field - Number of CSI RS resource configuration | |
|---|---|---|
| Antenna ports number N Bit number: 4 bits | 1st Bit number: 5 bits | 2nd Bit number: 5 bits |
| 1 | resourceConfig of 1 port | N/A |
| 2 | resourceConfig of 2 ports | N/A |
| 3 | resourceConfig of 2 ports | resourceConfig of 1 port |
| 4 | resourceConfig of 4 ports | N/A |
| 5 | resourceConfig of 4 ports | resourceConfig of 1 port |
| 6 | resourceConfig of 4 ports | resourceConfig of 2 ports |
| 7 | resourceConfig of 4 ports | resourceConfig of 4 ports, 3 ports used |
| 8 | resourceConfig of 8 ports | N/A |
| 9 | resourceConfig of 8 ports | resourceConfig of 1 port |
| 10 | resourceConfig of 8 ports | resourceConfig of 2 ports |
| 11 | resourceConfig of 8 ports | resourceConfig of 4 ports, 3 port used |
| 12 | resourceConfig of 8 ports | resourceConfig of 4 ports |
| 13 | resourceConfig of 8 ports | resourceConfig of 8 ports, 5 ports used |
| 14 | resourceConfig of 8 ports | resourceConfig of 8 ports, 6 ports used |
| 15 | resourceConfig of 8 ports | resourceConfig of 8 ports, 7 ports used |
| 16 | resourceConfig of 8 ports | resourceConfig of 8 ports |

In one embodiment, at block 201, the number of antenna ports to be used for the transmission pattern may be indicated via a radio resource control (RRC) signaling; and at block 202, the K resource configurations may be indicated via the same RRC signaling. For example, the information fields of an antennaPortsCount and K resourceConfig shown in Table 2 can be transmitted to UE in a single RRC signaling. It can be appreciated that the indication can also be transmitted via any other suitable signaling(s).

Though in some embodiments, the method 200 can be used for CSI-RS transmission pattern configuration, it can be appreciated that the method 200 can be widely applied to other use cases, for transmission pattern configuration of any suitable signal.

In one embodiment, additionally or alternatively, the method 200 may comprise a block 203, where the base station indicate a set of physical resource blocks (PRBs), in which the K resource configurations apply. That is, the K resource configurations like that shown in FIG. 3A or 3B do not present in all PRB pairs, but only apply in the indicated PRB set. One example is shown in Table 6A, where an information field PRBConfig is used for indicating the set of PRBs. The indicated set of PRBs can be a comb-like PRB pattern, in one embodiment. That is, there is one PRB used for the CSI-RS every L PRBs, where L is an integer larger than 1. Different UEs can be configured with different resource configurations and different comb-like PRB patterns for CSI-RS transmission. Additional signaling bits may be needed for indicating the PRB comb-pattern in frequency domain. Alternatively, the indicated set of PRBs may also be, for example, several consecutive PRBs, or, consecutive odd/even PRBs.

TABLE 6A

Example of transmission pattern configuration (with PRB set indication)

| | |
|---|---|
| antennaPortsCount | ENUMERATED {an1 -- M}, |
| resourceConfig | Configuration of N1-port CSI-RS |
| ... | ... |
| resourceConfig | Configuration of Nk-port CSI-RS |
| PRBConfig | optional, PRB comb-pattern in frequency domain |
| subframeConfig | INTEGER (0 ... 154), |

In another embodiment, at block 203, the base station may indicate a set of PRBs for each of the K resource configurations, as shown in Table 6B. That is, each of the K resource configurations may be applied in different PRB set, which provides more flexibility for signal (e.g., CSI-RS) transmission pattern configuration.

TABLE 6B

Example of transmission pattern configuration (with PRB set indication for each resource configuration)

| | |
|---|---|
| CSI-RS-Config | |
| antennaPortsCount | ENUMERATED {an1 -- M}, |
| resourceConfig | Configuration of N1-port CSI-RS |
| PRBConfig | optional |
| | PRB comb-pattern for N1-port in frequency domain |
| ... | ... |
| resourceConfig | Configuration of Nk-port CSI-RS |
| PRBConfig | optional |
| | PRB comb-pattern for Nk-port in frequency domain, or the offset to N1-port |
| subframeConfig | INTEGER (0 ... 154), |

It can be appreciated that block 203 may be applied with or without the block 202. That is, in one embodiment, even if the N antenna ports are not grouped into subsets and resource for the N antenna ports is only indicated using one resource configuration, for example as shown in Table 1, the base station can still configure a PRB set to indicate in which PRB(s) the resource configuration for the N antenna ports apply. That is, resource configuration flexibility can be improved by adding a PRBConfig field into the Table 1.

Additionally or alternatively, the method 200 may comprise a block 204, where the base station may indicate a set of subframes, in which K>=1 resource configurations apply, in one embodiment. One example is shown in Table 7A, where an information field subframeConfig is used for this purpose. In another embodiment, at block 204, the base station may indicate a set of subframes for each of the K>1 resource configurations, as shown in Table 7B. That is, each of the K resource configurations may apply in a different subframe set, and the total resource configuration for the N antenna ports spreads in multiple subframes. By this way, resource configuration flexibility is further improved.

TABLE 7A

Example of transmission pattern configuration (with subframe indication for K resource configurations)

| | |
|---|---|
| antennaPortsCount | ENUMERATED {an1 -- M}, |
| resourceConfig | Resource configuration of N1-port CSI-RS |
| ... | ... |
| resourceConfig | Resource configuration of Nk-port CSI-RS |
| subframeConfig | Subframe configuration, |

TABLE 7B

Example of transmission pattern configuration (with subframe indication for each resource configuration)

| | |
|---|---|
| antennaPortsCount | ENUMERATED {an1 -- M}, |
| resourceConfig | Resource configuration of N1-port CSI-RS |
| subframeConfig | Subframe configuration of N1-port CSI-RS, |
| ... | ... |
| resourceConfig | Resource configuration of Nk-port CSI-RS |
| subframeConfig | Subframe configuration of Nk-port CSI-RS, Or subframe offset with N1-port |

In an embodiment, a set of subframes being indicated at block 204 for one or all of the K resource configurations may include a special subframe of a TDD system. That is, by using the method 200, CSI-RS transmission in special subframe may be allowed. For example, resource for the ith subset of antenna ports may be configured in a special subframe, while resource for other antenna port subsets may be configured in normal subframes. In another exemplary embodiment, resource for one subset of antenna ports may be configured in a first special subframe, while resource for other antenna port subsets may be configured in another special subframe. In these cases, CSI-RS may be transmitted in the DwPTS part of one or more special subframes. Such a resource configuration may be applicable to certain TDD special subframe configurations defined in LTE, e.g., the TDD special subframe configurations 1, 2, 3, 4, 6, 7, 8 which provide 9, 10, 11 or 12 downlink symbols in the special subframe, respectively.

Since special subframe has less DL symbols than that of a normal subframe, the resource configuration applied in a special subframe may be a TDD special subframe specific resource configuration. In current LTE standard, 32 resource configurations (denoted as 0 to 31 in Table 4) are predefined for normal subframes, as shown in Table 4. In one embodiment of the disclosure, additional TDD special subframe specific resource configurations can be introduced on top of that. One example is shown in Table 8, where the resourceConfig may indicate one resource configuration pattern from N_TDD+1 candidates (0, 1, ..., N_TDD). In one embodiment, the number N_TDD is larger than 31, since some TDD special subframe specific configurations are added on top of original 0 to 31 configurations. In another embodiment, the N_TDD+1 candidates are all TDD special subframe specific configurations newly introduced.

TABLE 8

Example of transmission pattern configuration (with TDD special
subframe specific resource configuration introduced)

| | |
|---|---|
| antennaPortsCount | ENUMERATED {an1--M}, |
| resourceConfig | INTEGER (0 . . . N_TDD) |
| subframeConfig | INTEGER (0 . . . 154), |

As described above, the base station can indicate K>1 resource configurations to configure resource for N antenna ports. Some or all of the K resource configurations can indicate a resource pattern from the N_TDD+1 candidates, in one embodiment.

Figure 4A:
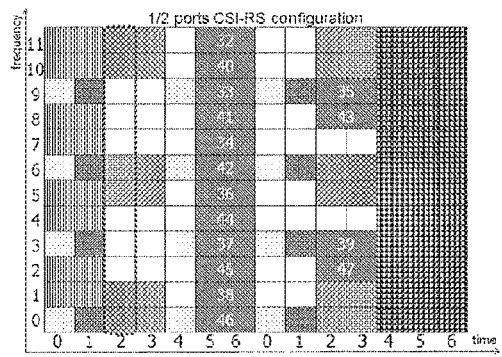
FIGS. 4A-4M illustrate examples for Time Division duplex (TDD) special subframe specific resource configurations.
Figure 4B:
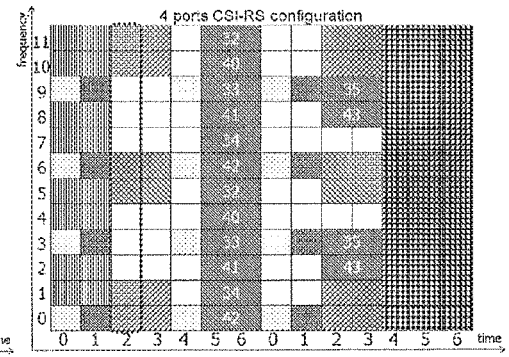
Figure 4C:
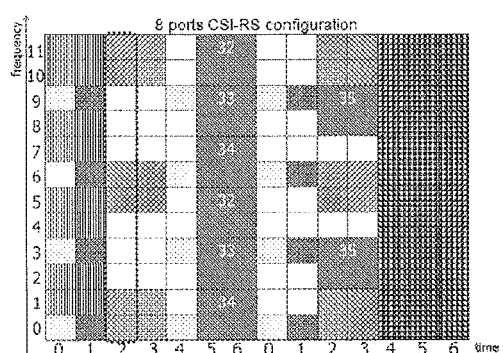
Figure 4D:
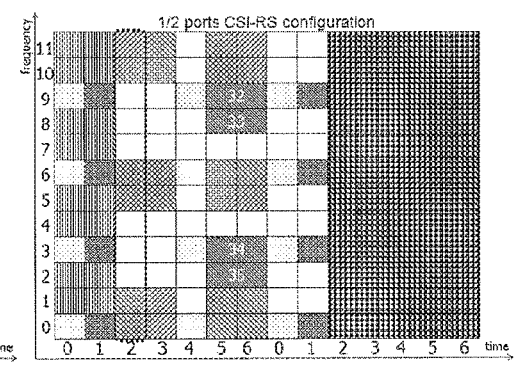
Figure 4E:
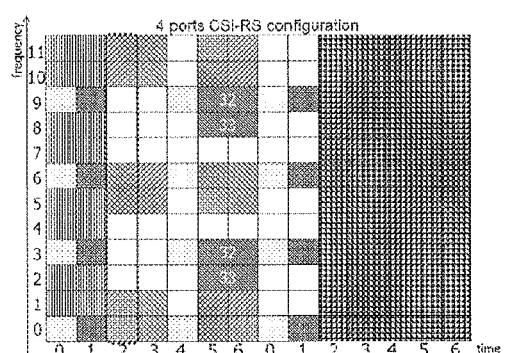
Figure 4F:
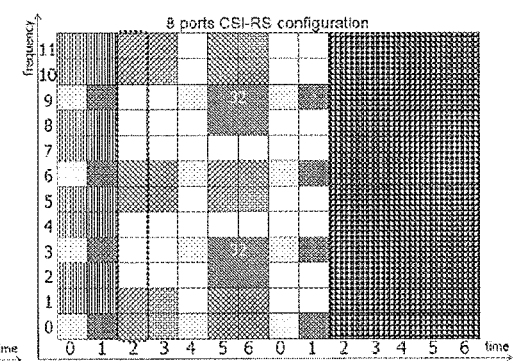
Figure 4G:
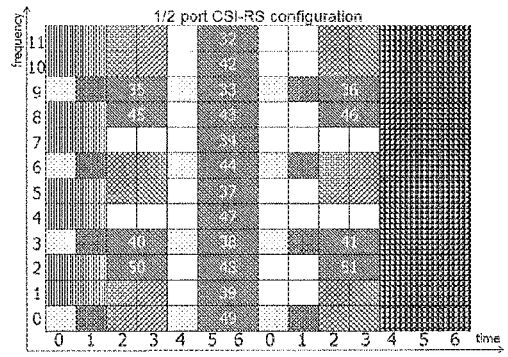
Figure 4H:
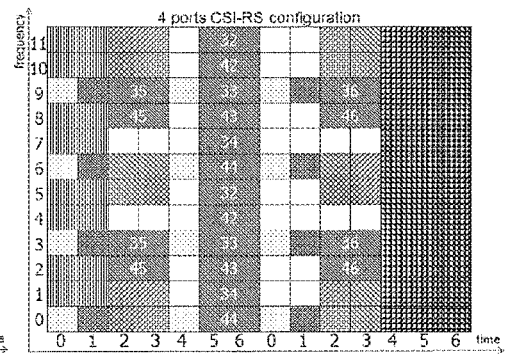
Figure 4I:
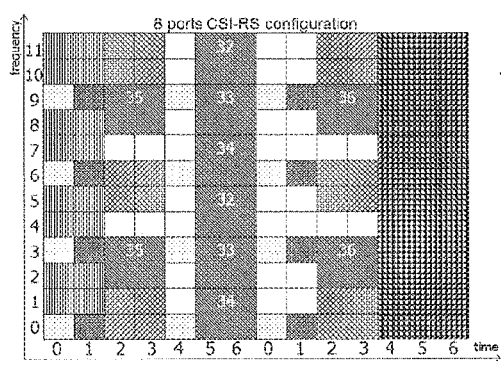
Figure 4J:
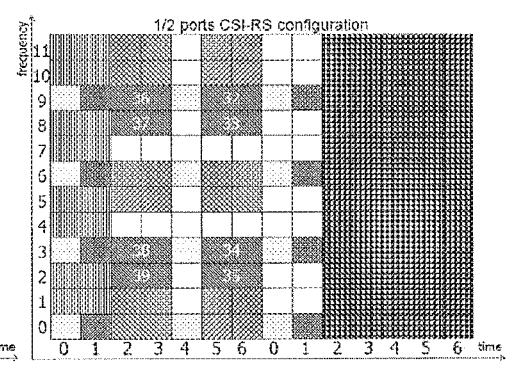
Figure 4K:
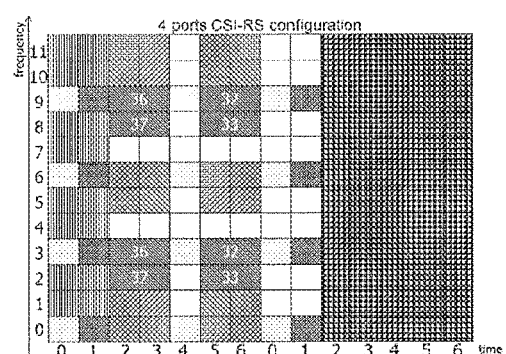
Figure 4L:
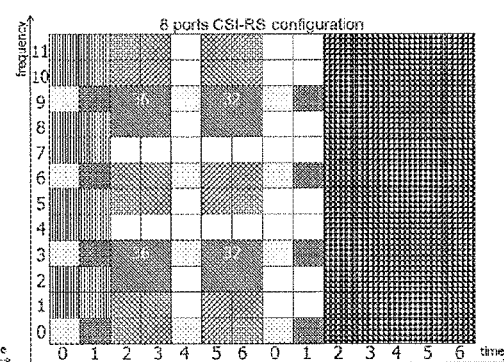
Figures 4M, 5A, 5B, 5C:
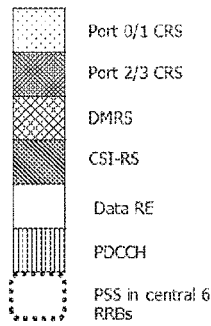
FIGS. 5A-5D illustrate examples of CRS resource configuration in subbands of the system bandwidth, according to some embodiments of the disclosure.
Figure 5D:
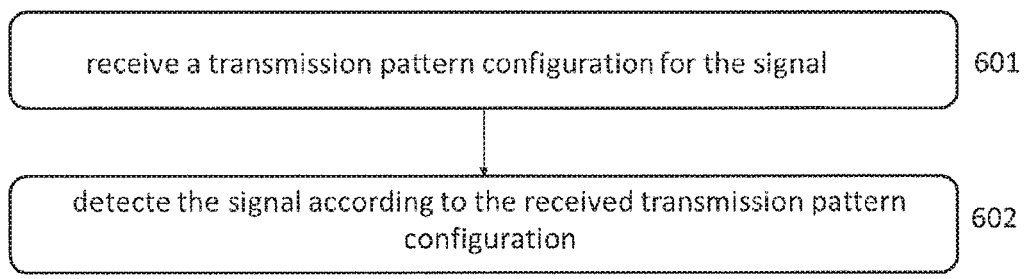

In one embodiment, the introduced TDD special subframe specific resource configuration may indicate resources that do not collide with resources for primary synchronization signal (PSS), secondary synchronization signal (SSS), paging information, system information block 1 (SIB1), and physical broadcast channel (PBCH). Collision with cell-specific RS (CRS), demodulation RS (DMRS) should also be avoided. Some examples for the TDD special subframe specific resource configurations are illustrated schematically in FIGS. 4A-4M, wherein FIG. 4M shows a legend applying to FIGS. 4A-4L. FIGS. 4A-4C are examples of resource configuration for 1 or 2, 4, 8 antenna ports respectively in a TDD special subframe with 11 or 12 OFDM symbols in DwPTS. Particularly, FIG. 4A shows 16 1-port or 2-ports CSI-RS resource configuration patterns (denoted as 32 to 47 in the figure); FIG. 4B show 8 4-ports CSI-RS resource configuration patterns (denoted as 32-35, 40-43 in the figure); and FIG. 4C show 4 8-ports CSI-RS resource configuration patterns (denoted as 32 to 35 in the figure). FIGS. 4D-4F are examples of resource configuration for 1 or 2, 4, 8 antenna ports respectively in a TDD special subframe with 9 or 10 OFDM symbols in DwPTS. FIGS. 4G-4I are examples of resource configuration in a PRB not belonging to the central 6 PRBs for 1 or 2, 4, 8 antenna ports respectively in a TDD special subframe with 11 or 12 OFDM symbols in DwPTS, and FIGS. 4K-4L provide examples of resource configuration in a PRB not belonging to the central 6 PRBs for 1 or 2, 4, 8 antenna ports respectively in a TDD special subframe with 9 or 10 OFDM symbols in DwPTS. Since in a PRB not belonging to the central 6 PRBs, there is no resource reservation for PSS/SSS transmission, and thus more resources are available for CSI-RS transmission, that's why in the example of FIGS. 4G-4L, more resource configuration patterns can be provided comparing with that of FIGS. 4A-4F.

Additionally or alternatively, in one embodiment, the method 200 may comprise a block 205, where the base station indicates a subband of the wireless system, in which the K resource configurations apply. In another embodiment, the base station may indicate at block 205 a subband of the wireless system for each of the K resource configurations. As shown in FIGS. 5A-5D, frequency resource of the system can be divided into multiple subbands, e.g., 3 subbands which can be central 6 PRBs, the upper half band and the lower half band, respectively. In case of a TDD special subframe configuration 0, there can be resources for CSI-RS transmission from a subset of antenna ports in the central 6 PRBs and the lower half band in subframe (SF) 0, and resources for CSI-RS transmission from same or different subset of antenna ports in the upper half band in SF 1, as shown in FIG. 5A. Alternatively, as shown in FIG. 5B, there can be resources for CSI-RS transmission from a subset of antenna ports in the central 6 PRBs and the upper half band in subframe (SF) 0, and resources for CSI-RS transmission from same or different subset of antenna ports in the lower half band in SF 1. In the example of FIG. 5C, resource for CSI-RS from a subset of antenna ports can be configured in the lower half band in SF 0, and resource for CSI-RS from same or different subset of antenna ports can be configured in the central 6 PRBs and the upper half band in SF 1. In another example shown in FIG. 5D, the resource for CSI-RS from a subset of antenna ports can be configured in the upper half band in SF 0, and resource for CSI-RS from same or different subset of antenna ports can be configured in the central 6 PRBs and the lower half band in SF 1. In these cases, the paging can be scheduled in only half band of the system to avoid collision. Accordingly, at block 205, the base station may indicate a subband where one or all of the K resource configurations apply. One example is shown in Table 9 below, where an information field SubBandConfig is used for this purpose to indicate a subband where all of the K resource configurations apply. In another exemplary embodiment, the base station may indicate a subband indication for each of the K resource configurations. In addition, it can be appreciated that though 3 subbands are illustrated in the examples of FIGS. 5A-5D, embodiments are not limited thereto. More or less subbands can be defined in other embodiments.

TABLE 9

Example of transmission pattern configuration
(with subband indication)

| | |
|---|---|
| antennaPortsCount | ENUMERATED {an1 -- M}, |
| resourceConfig | Configuration of N1-port CSI-RS |
| . . . | . . . |
| resourceConfig | Configuration of Nk-port CSI-RS |
| SubBandConfig | Optional, Configuration of subband |
| subframeConfig | Configuration CSI-RS, corresponding to the CSI-RS in Downlink SF or special SF (pre-defined) |

Likewise, it can be appreciated that block 205 may be applied with or without the block 202. That is, in one embodiment, even if the N antenna ports are not grouped into subsets and resource for the N antenna ports is only indicated using one resource configuration (K=1) for example as shown in Table 1, the base station can still configure a subband to indicate in which subband(s) the resource configuration for the N antenna ports apply. That is, resource configuration flexibility can be improved by adding a SubBansConfig field into the Table 1.

Figure 6:
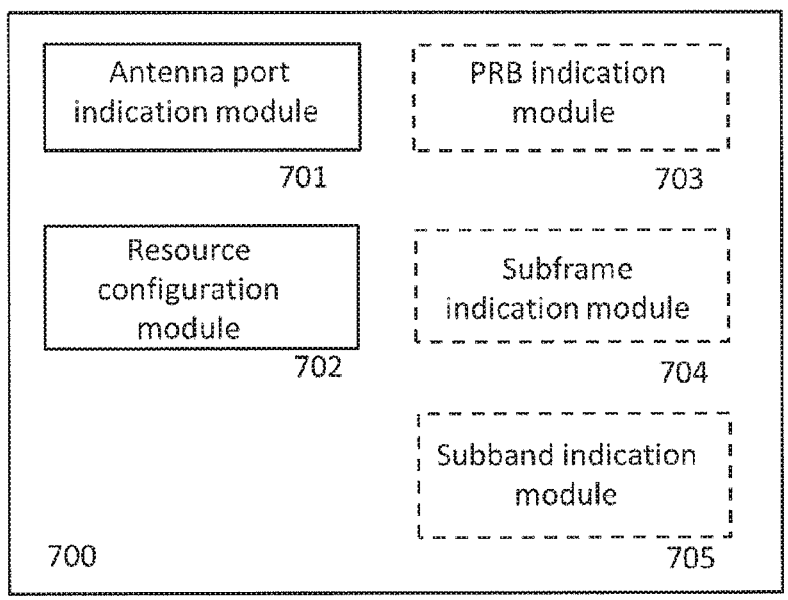
FIG. 6 illustrates a flow chart of a method 600 in a user equipment in a wireless system.

Reference is now made to FIG. 6, which illustrate a flow chart of a method 600 in a wireless system. The method can be implemented by a user equipment, e.g., UE 104 shown in FIG. 1, or any suitable devices.

As shown in FIG. 6, the method 600 comprises receiving a transmission pattern configuration for the signal at block 601, and detecting the signal according to the received transmission pattern configuration at block 602; wherein the transmission pattern configuration comprises: an indication indicating a number of antenna ports to be used for the signal transmission and K resource configurations, wherein each resource configuration indicates resource for one of K subsets of antenna ports, wherein K>1 and the K subsets of antenna ports form a set of the number of antenna ports.

The transmission pattern configuration received at block 601 can be that indicated according to method 200, in one embodiment, and thus details regarding the transmission pattern described with reference to method 200 also apply here. The transmission pattern configuration can be used for CSI-RS, however, embodiments of the disclosure are not limited thereto.

As described with reference to method 200, each of the K resource configurations can be selected from a predefined set of configurations, in one embodiment. The predefined set of configurations can be existing resource configuration patterns defined in, for example, LTE specification, as shown in Table 4. Thereby, the method 600 allows reusing resource configuration for a small number of antenna ports to indicate resource configuration for a large number of antenna ports.

In one embodiment, there are $N_i$ antenna ports in the ith ($1<=i<=K$) subset of the K subsets, and wherein all $N_i$ may belong to a predefined set of integers. In one embodiment, all but the smallest $N_i$ may belong to a predefined set of integers. The predefined set of integers may be, for example, {1, 2, 4, 8} which are the number of antenna ports for CSI_RS transmission supported by current LTE specification. It can be appreciated that embodiments of the disclosure are not limited thereto.

In one embodiment, at block 601, the K resource configurations included in the transmission pattern configuration signaling received at block 601 may be indicated according to a predefined order, and the predefined order may depend on size of each of the K subsets of antenna ports. For instance, in the received signaling at block 601, resource configuration for a larger subset of antenna ports (e.g., a subset with 8 antenna ports) may be indicated first, then followed by resource configuration for a small subset of antenna ports (e.g., a subset with 2 antenna ports).

In another embodiment, one of the K resource configurations may indicate resource for one of the K subsets by using part of the one resource configuration, as shown in Table 5B. That is, an existing resource configuration for 4 antenna ports may be used to indicate a resource configuration for 3 (or less) antenna ports, by leaving 1 port unused. By this way, it allows to use existing resource configuration and avoid design new resource configuration pattern for a specific number (e.g., 3) of antenna ports. Additionally, it may also avoid dividing the antenna ports into too many subsets, that is, reduce the number of K, and thus configuration signaling may be reduced, in some embodiments.

The transmission pattern configuration for the signal may be received via RRC signaling at block 601, in one embodiment; however, embodiments are not limited thereto. Likewise, the transmission pattern configuration received may be used for CSI-RS, but embodiments are not limited thereto.

In one embodiment, detecting the signal according to the received transmission pattern configuration at block 602 comprises detecting the signal in the resource indicated by the transmission pattern configuration.

Additionally or alternatively, the transmission pattern configuration received at block 601 may comprise an indication of a set of PRBs where the K resource configurations apply, in one embodiment. One example can be found in Table 6A. In another embodiment, the transmission pattern configuration received at block 601 may comprise an indication of a set of PRBs for each of the K resource configurations, as shown in Table 6B. Such implementation provides more configuration flexibility.

In still another embodiment, additionally or alternatively, the transmission pattern configuration may comprise an indication of a set of subframes, in which the $K>=1$ resource configurations apply, as shown in Table 7A. In another embodiment, the transmission pattern configuration may comprise an indication of a set of subframes for each of the $K>1$ resource configurations, as shown in Table 7B. In one embodiment, a set of subframes being indicated may include a special subframe of a time division duplex TDD system, and the resource configuration applied in the set of subframes may indicate a TDD special subframe specific resource configuration. Examples for the TDD special subframe specific resource configuration can be found in FIGS. 4A-4L, but embodiments of the disclosure are not limited thereto.

In one embodiment, the TDD special subframe specific resource configuration indicates resources that do not collide with resources for primary synchronization signal PSS, secondary synchronization signal SSS, system information block 1, and physical broadcast channel PBCH.

In another embodiment, additionally or alternatively, the transmission pattern configuration may comprise an indication of a subband of the wireless system, in which the $K>=1$ resource configurations apply. For example, the system bandwidth can be divided into 3 subsets as shown in FIGS. 5A-5D, and the received transmission pattern configuration signaling may include an information field for indicating in which subband a resource configuration apply. It allows restricting the transmission of the signal (e.g., CSI-RS) into a specifics subband, and thereby reducing overhead. In another embodiment, the transmission pattern configuration may comprise an indication of a subband of the wireless system for each of the $K>1$ resource configurations. It allows each of the K resource configuration apply to different subband, and provides more configuration flexibility.

Note that operations described with reference to the blocks of any method herein do not have to be performed in the exact order disclosed, unless explicitly stated. That is, operations at the blocks may also be performed reversely to the order as shown or concurrently.

Figure 7:
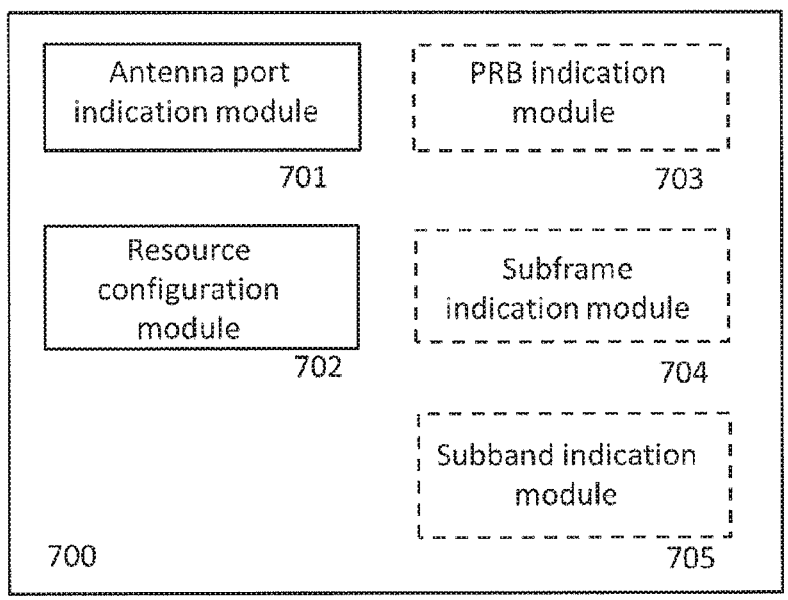
FIG. 7 illustrates a schematic block diagram of an apparatus in a wireless system for configuring transmission pattern according to an embodiment of the present disclosure.

Reference is now made to FIG. 7, which illustrates a schematic block diagram of an apparatus 700 in a wireless system for configuring transmission pattern according to an embodiment of the present disclosure. In one embodiment, the apparatus 700 may be implemented as a base station, or a part thereof. Alternatively or additionally, the apparatus 700 may be implemented as any other suitable network element in the wireless communication system. The apparatus 700 is operable to carry out the example method 200 described with reference to FIG. 2, and possibly any other processes or methods. It is also to be understood that the method 200 is not necessarily carried out by the apparatus 700. At least some blocks of the method 200 can be performed by one or more other entities.

As illustrated in FIG. 7, the apparatus 700 comprises an antenna port indication module 701, configured to indicate a number of antenna ports to be used for the transmission pattern; and a resource configuration module 702, configured to configure transmission resource for the number of antenna ports by indicating K resource configurations, with each resource configuration indicating resource for one of K subsets of antenna ports, wherein K>1 and the K subsets form a set of the number of antenna ports.

In one embodiment, antenna port indication module 701 and the resource configuration module 702 can be configured to perform the operations described with reference to blocks 201 and 202 of the method 200, respectively, and thus, some detailed descriptions for 701-702 may be omitted here.

In one embodiment, each of the K resource configurations indicated by the resource configuration module 702 may be selected from a predefined set of configurations, for example but not limited to, the 32 configurations shown in Table 4.

As one example, the K subsets can be subset 1 with $N_1$=4 antenna ports, and subset 2 with $N_2$=2 antenna ports, and the K=2 subsets form a set of N=6 antenna ports.

In another embodiment, the ith subset of the K subsets may contain $N_i$ antenna ports, and all of the K $N_i$ or all but the smallest $N_i$ may belong to a predefined set of integers. The predefined set of integers can be, but not limited to {1, 2, 4, 8}. In still another embodiment, $N_i$ can be any suitable number smaller than or equal to N.

The resource configuration module 702 may be configured to indicate the K resource configurations according to a predefined order, and the predefined order may depend on size of each of the K subsets of antenna ports. Embodiments of the disclosure are not limited to any to specific indication order, as long as the order is known to both transmitter and receiver.

In one embodiment, the resource configuration module 702 may be configured to indicate resource for one of the K subsets by using part of one of the K resource configurations.

In another embodiment, the antenna port indication module 701 may be configured to indicate the number of antenna ports via a radio resource control RRC signaling; and the resource configuration module 702 may be configured to indicate the K resource configurations via the same RRC signaling.

Though in some embodiments descried, the transmission pattern is configured for CSI-RS, embodiments of the disclosure are not limited thereto. The apparatus 700 can be used for configuring transmission pattern for any suitable signal.

In one embodiment, additionally or alternatively, the apparatus 700 may comprise a PRB indication module 703, configured to indicate a set of physical resource blocks PRBs, in which the K>=1 resource configurations apply, or, indicate, a set of physical resource blocks PRBs for each of the K>1 resource configurations. Examples for such indications can be found in Table 6A and 6B, respectively.

In another embodiment, additionally or alternatively, the apparatus 700 may comprise a subframe indication module 704, configured to indicate a set of subframes, in which the K>=1 resource configurations apply, or, indicate, a set of subframes for each of the K>1 resource configurations. Example for the subframe indication can be found in Table 7A and Table 7B. A set of subframes being indicated may include a special subframe of a time division duplex TDD system, and a resource configuration applies in the set of subfames may indicate a TDD special subframe specific resource configuration. In some embodiments, the TDD special subframe specific resource configuration indicates resources that do not collide with resources for primary synchronization signal PSS, secondary synchronization signal SSS, system information block 1, and physical broadcast channel PBCH.

Alternatively or additionally, the apparatus 700 may comprise a subband indication module 705, configured to indicate a subband of the system, in which the K resource configurations apply, or, indicate, a subband of the system for each of the K resource configurations. Examples for subband indication can be found in Table 9.

Figure 8:
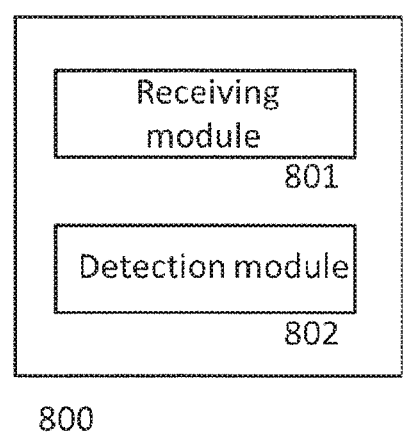
FIG. 8 illustrates a schematic block diagram of an apparatus in communication with the apparatus shown in FIG. 7, according to an embodiment of the present disclosure.

Reference is now made to FIG. 8, which illustrate a schematic block diagram of an apparatus 800 in communication with the apparatus 700 in a wireless system, according to an embodiment of the present disclosure. In one embodiment, the apparatus 800 may be implemented as UE or a part thereof. Alternatively or additionally, the apparatus 800 may be implemented as any other suitable devices in the wireless communication system. The apparatus 800 is operable to carry out the example method 600 described with reference to FIG. 6 and possibly any other processes or methods. It is also to be understood that the method 600 is not necessarily carried out by the apparatus 800. At least some steps of the method 600 can be performed by one or more other entities.

As shown in FIG. 8, the apparatus 800 comprises a receiving module 801, configured to receive a transmission pattern configuration for the signal, and a detection module 802, configured to detect the signal according to the received transmission pattern configuration. The transmission pattern configuration may comprise an indication indicating a number of antenna ports to be used for the signal transmission; and K resource configurations, wherein each resource configuration indicates resource for one of K subsets of antenna ports, and wherein K>1 and the K subsets of antenna ports form a set of the number of antenna ports.

In one embodiment, each of the K resource configurations may be selected from a predefined set of configurations. An example for the predefined set of configurations can be found in Table 4. It can be appreciated, however, embodiments of the disclosure are not limited thereto. The ith subset of the K subsets contains $N_i$ antenna ports, wherein 1<=i<=K, and all $N_i$ or all but the smallest $N_i$ may belong to a predefined set of integers. For instance, the predefined set of integers can be, but not limited to {1, 2, 4, 8}.

In another embodiment, the K resource configurations included in the transmission pattern configuration may be indicated in a predefined order. The predefined order may depend on size of each of the K subsets.

In still another embodiment, one of the K resource configurations may indicate resource for one of the K subsets by using part of the one resource configuration.

The receiving module 801 may be configured to receive the transmission pattern configuration via a radio resource control RRC signaling, in one embodiment. However, embodiments of the disclosure are not limited thereto. The transmission pattern configuration can be used for the CSI-RS, in one embodiment; and can be used for another signal in other embodiments.

As described with reference to method 200 and 400, the transmission pattern configuration may comprise an indication of a set of physical resource blocks PRBs where the K>=1 resource configurations apply, or, an indication of a set of physical resource blocks PRBs for each of the K>1 resource configurations, in one embodiment. Examples for such transmission pattern configurations can be found in Table 6A and 6B.

In another embodiment, the transmission pattern configuration may comprise an indication of a set of subframes, in which the K>=1 resource configurations apply, or, an indication of a set of subframes for each of the K>1 resource configurations. Examples for such transmission pattern configuration have been described with reference to Table 7A and Table 7B, and will not be detailed here. A set of subframes being indicated may include a special subframe of a time division duplex TDD system in one embodiment. A resource configuration applied in the set of subfames may indicate a TDD special subframe specific resource configuration. The TDD special subframe specific resource configuration may indicate resources that do not collide with resources for primary synchronization signal PSS, secondary synchronization signal SSS, system information block 1, and physical broadcast channel PBCH, in one embodiment.

In another embodiment, the transmission pattern configuration may comprise an indication of a subband of the system, in which the K>=1 resource configurations apply, or, an indication of a subband of the system for each of the K>1 resource configurations. Examples for the subband indication can be found in Table 9.

It can be appreciated that some modules in the apparatus 700 and 800 can be combined in some implementations. For example, in one embodiment, it is possible to use a single indication module to function as the antenna port indication module 701, the resource configuration module 702, the PRB indication module 703, the subframe indication module 704 and the subband indication module 705 in the apparatus 700 as discussed above.

Figure 9:
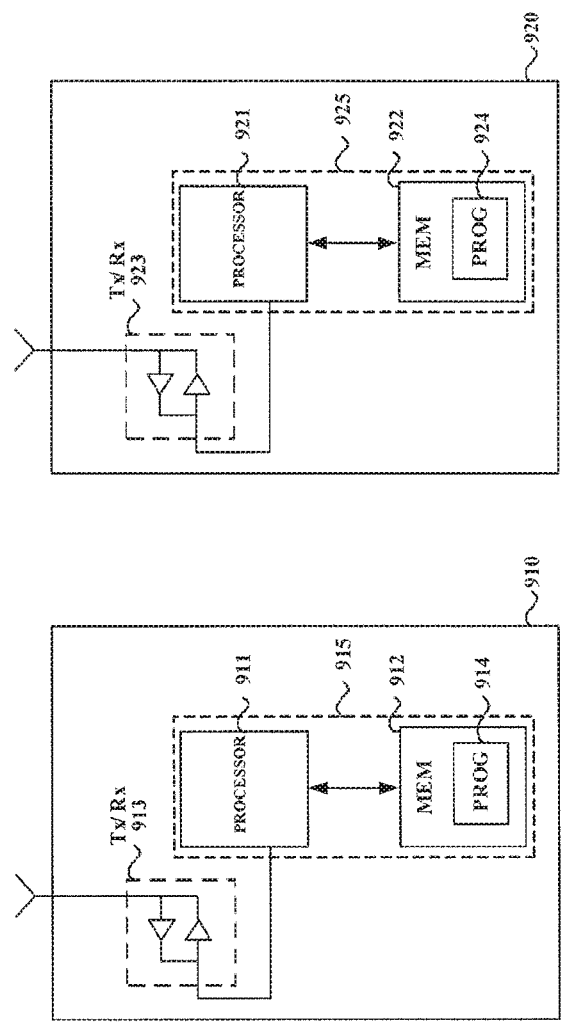
FIG. 9 illustrates a simplified block diagram of apparatus that are suitable for use in practicing the embodiments of the present disclosure.

FIG. 9 illustrates a simplified block diagram of an apparatus 910, and an apparatus 920 that are suitable for use in practicing the embodiments of the present disclosure. The apparatus 910 may be a base station; the apparatus 920 may be UE.

The apparatus 910 comprises at least one processor 911, such as a data processor (DP) 911 and at least one memory (MEM) 912 coupled to the processor 911. The apparatus may further comprise a suitable RF transmitter TX and receiver RX 913 (which may be implemented in a single component or separate components) coupled to the processor 911. The MEM 912 stores a program (PROG) 914. The PROG 914 may include instructions that, when executed on the associated processor 911, enable the apparatus 910 to operate in accordance with the embodiments of the present disclosure, for example to perform the method 200. The TX/RX 913 may be used for bidirectional radio communication with other apparatuses or devices in the network, e.g. the apparatus 920. Note that the TX/RX 913 may have multiple antennas (e.g., an AAS) to facilitate the communication. A combination of the at least one processor 911 and the at least one MEM 912 may form processing means 915 adapted to implement various embodiments of the present disclosure.

The apparatus 920 comprises at least one processor 921, such as a DP, at least one MEM 922 coupled to the processor 921. The apparatus 720 may further comprise a suitable RF TX/RX 923 (which may be implemented in a single component or separate components) coupled to the processor 921. The MEM 922 stores a PROG 924. The PROG 924 may include instructions that, when executed on the associated processor 921, enable the apparatus 920 to operate in accordance with the embodiments of the present disclosure, for example to perform the method 600. The TX/RX 923 is for bidirectional radio communications with other apparatuses or devices in the network, e.g. the apparatus 910. Note that the TX/RX 923 may have multiple antennas to facilitate the communication. A combination of the at least one processor 921 and the at least one MEM 922 may form processing means 925 adapted to implement various embodiments of the present disclosure.

Various embodiments of the present disclosure may be implemented by computer program executable by one or more of the processor 911, 921 in software, firmware, hardware or in a combination thereof.

The MEMs 912, 922 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the apparatuses 910, 920, there may be several physically distinct memory units in them.

The processors 911, 921 may be of any type suitable to the local technical environment, and may include one or more of general purpose computers, special purpose computers, microprocessors, digital signal processors (DSPs) and processors based on multicore processor architecture, as non-limiting examples. Each of the apparatuses 910, 920 may have multiple processors, such as an application specific integrated circuit (ASIC) chip that is slaved in time to a clock which synchronizes the main processor.

Although the above description is made in the context of LTE, it should not be construed as limiting the spirit and scope of the present disclosure. The idea and concept of the present disclosure can be generalized to also cover other wireless networks including non-cellular network, e.g., ad-hoc network.

In addition, the present disclosure provides a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods, apparatuses, i.e. systems. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It should also be noted that the above described embodiments are given for describing rather than limiting the disclosure, and it is to be understood that modifications and variations may be resorted to without departing from the spirit and scope of the disclosure as those skilled in the art readily understand. Such modifications and variations are considered to be associated with the scope of the disclosure and the appended claims. The protection scope of the disclosure is defined by the accompanying claims.

What is claimed is:

1. A method performed by a base station, the method comprising:
configuring a transmission resource for Channel State Information Reference Signals (CSI-RS) corresponding to N antenna ports by aggregating K>1 resource configurations for transmission of the CSI-RS in a same subframe to obtain the N antenna ports in total, each of the K resource configurations corresponding to $N_i$ antenna ports, wherein $N=KN_i$;
transmitting the K resource configurations and information indicating frequency domain density of the transmission resource for the CSI-RS corresponding to the N antenna ports in terms of resource blocks, to a user equipment (UE); and
transmitting the CSI-RS, according to the frequency domain density, using a first group of resource blocks in a comb-like pattern with an interval of at least one resource block in frequency domain, wherein the K resource configurations are applied to the first group of resource blocks.

2. The method of claim 1, wherein K=3, $N_i$=4 or 8.

3. The method of claim 1, further comprising: transmitting an information indicating a number of antenna ports as a basis to obtain N.

4. The method of claim 3, wherein the information indicating the number of antenna ports is transmitted via a radio resource control RRC signaling.

5. The method of claim 4, wherein transmitting the K resource configurations comprises indicating the K resource configurations via the same RRC signaling.

6. The method of claim 1, further comprising: transmitting a signal to the UE on the N antenna ports.

7. The method of claim 1, wherein according to the frequency domain density, the reference signals are transmitted using every two resource blocks in frequency domain.

8. A method performed by a user equipment (UE), the method comprising:
receiving, from the base station:
K>1 resource configurations for transmission of Channel State Information Reference Signals (CSI-RS), wherein;
N antenna ports are obtained by aggregating the K resource configurations in a same subframe,
each of the K resource configurations corresponds to $N_i$ antenna ports, and
$N=KN_i$; and
information indicating frequency domain density of transmission resource for the CSI-RS corresponding to the N antenna ports in terms of resource blocks; and
receiving the CSI_RS from the base station, according to the frequency domain density, using a first group of resource blocks in a comb-like pattern with an interval of at least one resource block in frequency domain, wherein the K resource configurations are applied to the first group of resource blocks.

9. The method of claim 8, wherein K=3, $N_i$=4 or 8.

10. The method of claim 8, further comprising: receiving an information indicating a number of antenna ports as a basis to obtain N.

11. The method of claim 10, wherein the information indicating the number of antenna ports is received via a radio resource control (RRC) signaling.

12. The method of claim 11, wherein receiving the K resource configurations comprises receiving the K resource configurations via the same RRC signaling.

13. The method of claim 8, further comprising: receiving a signal from the base station on the N antenna ports.

14. The method of claim 8, further comprising:
transmitting the reference signals using every two resource blocks in frequency domain according to the frequency domain density.

15. A base station, comprising:
a controller, configured to configure a transmission resource for Channel State Information Reference Signals (CSI-RS) corresponding to N antenna ports by aggregating K>1 resource configurations for transmission of the CSI_RS in a same subframe to obtain the N antenna ports in total, each of the K resource configurations corresponding to $N_i$ antenna ports, wherein $N=KN_i$; and
a transceiver, configured to;
transmit the K resource configurations and information indicating frequency domain density of the transmission resource for the CSI_RS corresponding to the N antenna ports in terms of resource blocks to a user equipment (UE); and transmit the CSI_RS according to the frequency domain density, using a first group of resource blocks in a comb-like pattern with an interval of at least one resource block in frequency domain, wherein the K resource configurations are applied to the first group of resource blocks.

16. The base station of claim 15, further comprising:
a second transmission module, configured to transmit an information indicating a number of antenna ports as a basis to obtain N.

17. The base station of claim 16, wherein the information indicating the number of antenna ports is transmitted via a radio resource control (RRC) signaling.

18. The base station of claim 17, wherein transmitting the K resource configurations comprises transmitting the K resource configurations via the same RRC signaling.

19. The base station of claim 15, further comprising:
a third transmission module, configured to transmit a signal to the UE on the N antenna ports.

20. The base station of claim 15, wherein according to the frequency domain density, the reference signals are transmitted using every two resource blocks in frequency domain.

* * * * *